(12) United States Patent
Sceats et al.

(10) Patent No.: US 10,800,683 B2
(45) Date of Patent: *Oct. 13, 2020

(54) PROCESS FOR MANUFACTURE OF HYDROXIDE SLURRY

(71) Applicant: Calix Ltd, Pymble, NSW (AU)

(72) Inventors: Mark Sceats, Pyrmont (AU); Adam Vincent, Kent (GB)

(73) Assignee: Calix Ltd, Pymble, NSW (AU)

( * ) Notice: Subject to any disclaimer, the term of this patent is extended or adjusted under 35 U.S.C. 154(b) by 0 days.

This patent is subject to a terminal disclaimer.

(21) Appl. No.: 16/282,094

(22) Filed: Feb. 21, 2019

(65) Prior Publication Data

US 2019/0177194 A1 Jun. 13, 2019

Related U.S. Application Data

(63) Continuation of application No. 15/030,819, filed as application No. PCT/AU2014/000979 on Oct. 15, 2014, now Pat. No. 10,358,364.

(30) Foreign Application Priority Data

Oct. 24, 2013 (AU) .................................. 2013904096

(51) Int. Cl.
   *C02F 1/68* (2006.01)
   *C01F 5/16* (2006.01)
   (Continued)

(52) U.S. Cl.
   CPC ............. *C02F 1/68* (2013.01); *B01J 13/0008* (2013.01); *B01J 19/1881* (2013.01);
   (Continued)

(58) Field of Classification Search
   CPC ... C02F 1/68; C02F 1/5236; C02F 1/66; B01J 13/0008; B01J 19/1881; C01B 13/14; C01F 5/16; C04B 2/04
   See application file for complete search history.

(56) References Cited

U.S. PATENT DOCUMENTS

| | | |
|---|---|---|
| 2,904,401 A | 9/1959 | Booth |
| 3,573,002 A | 3/1971 | Zimmerman et al. |
| | (Continued) | |

FOREIGN PATENT DOCUMENTS

| | | |
|---|---|---|
| AU | 48785/93 A | 4/1994 |
| CA | 2865647 A1 | 9/2013 |
| | (Continued) | |

OTHER PUBLICATIONS

International Written Opinion for International Application No. PCT/AU2014-000979 dated Dec. 14, 2014, 6 pages.

(Continued)

*Primary Examiner* — Nicholas E Hill
(74) *Attorney, Agent, or Firm* — TraskBritt

(57) ABSTRACT

A method of manufacture of high-solids hydroxide slurries from caustic calcined carbonate powder is described, whereby the properties of the slurry are its low resistance to shear thinning to facilitate transport, a high stability for transport and storage, ease of reconstitution after long periods of storage, and, as required, a high concentration of chemically reactive species at the particle surface. The method achieves these specifications by mixing caustic calcined carbonate or hydroxide powder with water in an insulated reactor vessel, and agitating the slurry sufficiently such that the hydration reaction causes the water to spontaneously boil, such that the remaining hydration proceeds spontaneously under the fixed conditions of boiling through the water loss. The mixing process is preferably carried out by a shear pump. A viscosity modifier, such as acetic acid, is used to thin the slurry to enable the mixing system to maintain uniform mixing. The reaction is terminated when the boiling has spontaneously ceased and the temperature has spontaneously dropped to a set point though the reactor heat losses, where the processing time is sufficiently long that the slurry meets the desired specifications.

24 Claims, 1 Drawing Sheet

(51) Int. Cl.

| | | |
|---|---|---|
| *C01B 13/14* | (2006.01) | |
| *C04B 2/04* | (2006.01) | |
| *B01J 19/18* | (2006.01) | |
| *B01J 13/00* | (2006.01) | |
| *C02F 1/52* | (2006.01) | |
| *C02F 1/66* | (2006.01) | |
| C02F 101/20 | (2006.01) | |
| C02F 103/00 | (2006.01) | |

(52) U.S. Cl.
CPC ............... *C01B 13/14* (2013.01); *C01F 5/16* (2013.01); *C02F 1/5236* (2013.01); *C02F 1/66* (2013.01); *C04B 2/04* (2013.01); *B01J 2219/00121* (2013.01); *B01J 2219/00168* (2013.01); *B01J 2219/00186* (2013.01); *B01J 2219/00189* (2013.01); C02F 2101/20 (2013.01); C02F 2103/005 (2013.01); C02F 2303/02 (2013.01); C02F 2303/04 (2013.01)

(56) References Cited

U.S. PATENT DOCUMENTS

| | | | |
|---|---|---|---|
| 4,230,610 A | | 10/1980 | Falcione et al. |
| 4,430,248 A | | 2/1984 | Rey |
| 4,743,396 A | | 5/1988 | Fong et al. |
| 5,487,879 A | | 1/1996 | Vvitkowski et al. |
| 5,514,357 A | | 5/1996 | Richmond et al. |
| 5,544,971 A | | 8/1996 | Huege et al. |
| 5,762,901 A | | 6/1998 | Richmond et al. |
| 5,877,247 A | | 3/1999 | Mahar |
| 5,899,563 A | | 5/1999 | Karras |
| 5,906,804 A | * | 5/1999 | Aral .................... C01F 5/14 423/265 |
| 6,451,281 B1 | | 9/2002 | Ebeling et al. |
| 9,913,475 B2 | | 3/2018 | Sceats |
| 10,358,364 B2 | * | 7/2019 | Sceats .................... C02F 1/66 |
| 2004/0175324 A1 | | 9/2004 | Hassibi |
| 2012/0328510 A1 | | 12/2012 | Christy et al. |
| 2013/0142473 A1 | | 6/2013 | Nakagawa et al. |
| 2017/0035053 A1 | | 2/2017 | Sceats |

FOREIGN PATENT DOCUMENTS

| | | |
|---|---|---|
| CN | 1554587 A | 12/2004 |
| CN | 102774862 B | 4/2014 |
| DE | 3323730 A1 | 1/1985 |
| DE | 241247 A1 | 12/1986 |
| DE | 246971 A1 | 6/1987 |
| DE | 272288 A1 | 10/1989 |
| DE | 0280745 A1 | 7/1990 |
| DE | 4302539 A1 | 8/1993 |
| EP | 0599085 B1 | 9/1996 |
| EP | 1160201 A2 | 12/2001 |
| EP | 1009717 A4 | 6/2002 |
| EP | 0772570 B1 | 3/2003 |
| FR | 2399485 A1 | 3/1979 |
| JP | 54-150395 A | 11/1979 |
| JP | 61-270214 A | 11/1986 |
| JP | 62-007439 A | 1/1987 |
| JP | 63-277510 A | 11/1988 |
| JP | 63-277511 A | 11/1988 |
| JP | 01-131022 A | 5/1989 |
| JP | 01-212214 A | 8/1989 |
| JP | 02-048414 A | 2/1990 |
| JP | 03-197315 A | 8/1991 |
| JP | 03-060774 B2 | 9/1991 |
| JP | 03-249338 A | 11/1991 |
| JP | 03-252311 A | 11/1991 |
| JP | 05-208810 A | 8/1993 |
| JP | 05-279018 A | 10/1993 |
| JP | 5279017 B2 | 9/2013 |
| KR | 1993-0001256 | 2/1993 |
| WO | 99/08962 A1 | 2/1999 |
| WO | 2007/112496 A1 | 10/2007 |
| WO | 2008/128545 A1 | 10/2008 |
| WO | 2011/054831 A1 | 5/2011 |
| WO | 2013/142473 A1 | 9/2013 |

OTHER PUBLICATIONS

International Search Report for International Application No. PCT/AU2014-000979 dated Dec. 14, 2014, 4 pages.
European Search Report for European Application No. 14855476 dated May 29, 2017, 11 pages.
Chinese Search Report for Chinese Application No. 201480057776 dated Oct. 25, 2016, 2 pages.
Chinese First Office Action for Chinese Application No. 201480057776 dated Nov. 2, 2016, 21 pages.
Canadian Office Action for Canadian Application No. 2,925,924, dated Jun. 15, 2017, 3 pages.
Canadian Office Action for Canadian Application No. 2,925,924, dated Jan. 20, 2017, 4 pages.
Australian Second Office Action for Australian Application No. 2014339743 dated Jul. 10, 2017, 3 pages.
Australian First Office Action for Australian Application No. 2014339743 dated May 26, 2017, 4 pages.

* cited by examiner

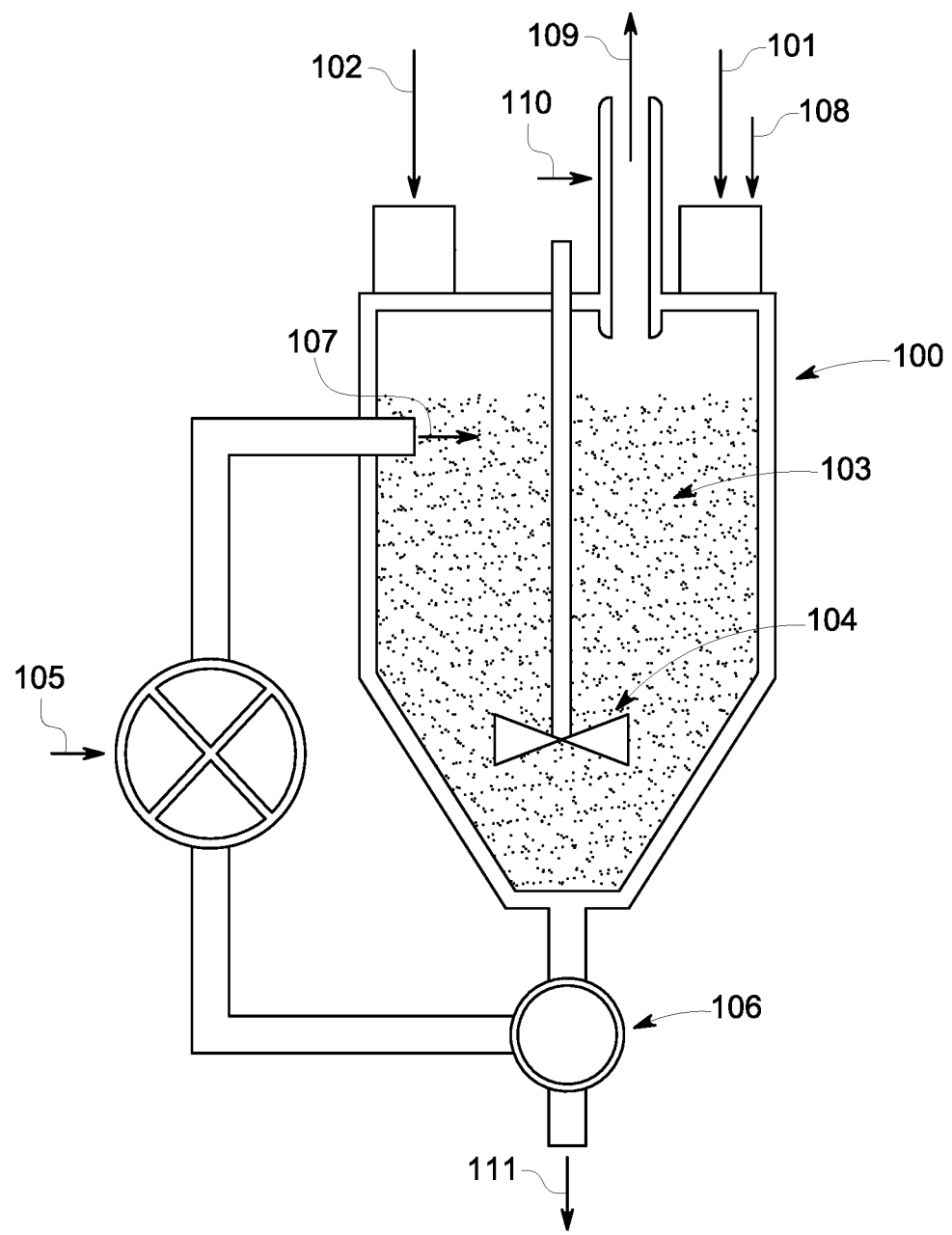

PROCESS FOR MANUFACTURE OF HYDROXIDE SLURRY

CROSS-REFERENCE TO RELATED APPLICATIONS

This application is a continuation of U.S. patent Ser. No. 15/030,819, filed Apr. 20, 2016, now U.S Pat. No. 10,358,364, issued Jul. 23, 2019, which is a national phase entry under 35 U.S.C. § 371 of International Patent Application PCT/AU2014/000979, filed Oct. 15, 2014, designating the United States of America and published in English as International Patent Publication WO 2015/058236 A1 on Apr. 30, 2015, which claims the benefit under Article 8 of the Patent Cooperation Treaty to Australian Patent Application Serial No. 2013904096, filed Oct. 24, 2013.

TECHNICAL FIELD

This disclosure broadly relates to a process and apparatus for manufacture of high-solids hydroxide slurries from caustic calcined carbonate powders that may be produced from calcination of magnesite, dolomite and limestone and mixtures thereof, whereby the slurries have low resistance to shear thinning to facilitate reconstitution after months of storage with mild agitation.

BACKGROUND

Hydroxide slurries are aqueous suspensions of solid hydrated oxides of primarily magnesium, as $Mg(OH)_2$, calcium $Ca(OH)_2$ and mixtures thereof, in water. They are widely used in many industrial processes, an example of which is the treatment of water to raise the pH and eliminate odors, particularly for sewerage treatment, and to precipitate heavy metals. These slurries are increasingly replacing sodium hydroxide because of their inherent properties.

For slurries with a high pH of about 12.0, a hydrated lime slurry $Ca(OH)_2$ or dolime slurry $Ca(OH)_2.Mg(OH)_2$ is used, whereas for slurries with a pH of about 10.4 when diluted in water, a magnesium hydroxide slurry $Mg(OH)_2$ or semidolime $Mg(OH)_2.CaCO_3$ slurry is used. For sewerage treatment, magnesium hydroxide slurry or semidolime slurry is preferred because any excess magnesium hydroxide entering digesters does not kill the bacteria, whereas overdosing of sodium hydroxide or hydrated lime slurry can destroy the bacteria and close down the digestion process. In heavy metal removal, the pH of the magnesium hydroxide or semidolime slurry is in the desirable range where amphoteric hydroxides of toxic metals precipitate, whereas at the pH of sodium hydroxide or hydrated lime, the initial precipitates re-dissolve.

Hydrated lime slurries are produced using lime, CaO, from a kiln, and the hydrators for that process are known in the art. Generally, the lime is sufficiently reactive that the slurry is formed quickly, in typically less than sixty minutes from granules of the order of 1 mm. The process may include grinding the lime, and generally the process requires the addition of dispersants to provide the required stability and to assist the slurry production process. Many of these dispersants are destroyed at high temperature, so that a lime hydrator is generally cooled.

Magnesium hydroxide slurries are produced from either precipitated magnesium hydroxide or from hydrating magnesium oxide, which has been generally produced from the calcination of the mineral magnesite.

Preferred properties of hydroxide slurries may include:
1. The slurry should contain particles that can react quickly when the slurry is, for example, mixed with waste water. Thus, a slurry may be composed of small particles with a median size of 5 μm and a low surface area about 4 $m^2/gm$ (as measured by gas absorption methods of the dried powder), or a median size of 20 μm and a high surface area about 20 $m^2/gm$. A wide, or multiple peaked, particle size distribution, with a sharp cut-off, is preferable to promote the slurry stability. Such a particle size distribution $d_{90}$ may be less than 100 microns.
2. The chemistry of the surfaces of the particles in the slurry are strongly dependent on the surface area of the oxide particles that are hydrated to form the slurry, and the range of applications of the slurry depend on these surface chemical properties. Thus, a slurry produced from oxide particles that have a surface area on the order of 150 $m^2/gm$ or higher have markedly different exterior chemical surface properties than a slurry produced from conventional oxide with a surface area of 20 $m^2/gm$. Without being bound by theory, oxide particles having a high surface area have larger amounts of energetic chemical defects, such as superoxides and peroxides, at the crystal grain boundaries, and these species largely survive hydration to confer on the slurry particle surfaces a different degree of surface chemistry that correlates with the surface area of the initial oxide used to form the slurry.
3. The percentage of solids by weight is at least 50%, and preferably 55-65%. The higher the solids content, then the less water is required to be shipped. However, the higher limit is generally the result of the requirements that the slurry has a low resistance to thinning and, thus, a low apparent viscosity at low shear rates. If the solids fraction is too high, a gel tends to form that has a high resistance to thinning and a high apparent viscosity, and is not readily usable in the applications described above.
4. The apparent viscosity at ambient temperature is 50-900 centipoise (cps), preferably 50-300 cps at a shear rate of 200 rpm or less. With such a low resistance to thinning, the slurry is regarded as thin, preferably when the apparent viscosity is less than 100 cP. The achievement of such thin, high-solids slurries generally requires a viscosity modifier to facilitate the breakdown of gels with minimum agitation. The desirability of thin slurries is that they are easily handled, and are more amenable to the application of subsequent processing steps that deliver desirable properties such as sprayed coatings that have a high strength because the low viscosity delivers an ease of application and surface coverage with a low water content that would otherwise cause cracking and/or low strength when dried due to the excessively high permeability from water evaporation during drying. In many applications, this desirable property of thin slurries is augmented by the surface chemistry that arises from the use of high surface area oxide particles used to produce the slurry.
5. The stability of the slurry is such that it can be used up to many months after manufacture. The characterization of slurry stability is often somewhat arbitrary and may involve meeting a number of criteria. For example:
   (i) One criterion may be that of pourability/flowability, so that more than 80% by weight, preferably greater than 90% by weight, of a bulk sample in, say, a 1-m³ container pours off after 7 days of undisturbed gravity settling, (ii) Another criterion may be that after 7 days of undisturbed (unagitated) gravity settling, water separation, called syneresis, in a vessel of 1 m³ container of 1 meter depth is less than 30 millimeters; or, in 30 days, the syneresis is less than 50 millimeters.

(iii) Another criterion may be that the slurry has less than 1% sediment ("heel") after 30 days.

(iv) Another criterion may be that the syneresis is less than 5% after 30 days, or preferably 3%.

It is recognized that these thin, high-solids slurries of variable chemical reactivity do not have a long intrinsic lifetime, and some degree of sedimentation occurs. For many applications, the re-suspendability of the slurry is much more critical than long-term slurry homogeneity, because agitation can be provided at the point of storage, and if required, such agitation during storage may be intermittent.

The choices of viscosity modifiers and stabilizers to produce stable, thin, high-solids slurries are generally associated with the surface charges on the particles and the ionic strength of the water. The viscosity modifiers and stabilizers are generally not specific to the method of manufacture of the slurry.

The prior art for the production of hydrated lime slurries from kiln lime is well understood. Of relevance to this disclosure, U.S. Pat. No. 3,573,002 discloses a two-stage process, and uses steam pressure to overcome differences in the hydration rates of lime and magnesia that otherwise cause significant issues in making slurries of mixed alkaline earth hydroxides. The use of pressure vessels adds to the complexity and cost of a slurry plant. The kiln lime is generally a burned lime in which the granules are sintered to give a moderate surface area. This is acceptable because the hydration process of lime causes the granules to break up from the stresses induced as the particles expand during the reaction to accommodate the water. There is a need for a process that can produce hydroxide slurries from un-sintered materials without the need for high-pressure processing. Conventional lime hydrator plants, operating at ambient pressure, require inputs of lime with low magnesium oxide content.

The prior art for the production of magnesium hydroxide slurries that meet the industrial requirements listed above is characterized by the initial solids materials used to make the slurry. It is noted that these processes do not generally use the approach of using high-pressure steam, as disclosed for hydrated lime with magnesia, to accelerate the magnesia hydration reactions. The magnesia particles generally do not exhibit significant fracturing from the hydration processes. These classes of materials for magnesium oxide slurries are:

a) Precipitated Magnesium Hydroxide (PMH).

PMH is generally produced by the precipitation of magnesium hydroxide from brines by the addition of hydrated lime. The prior art, described below, focuses on the use of (i) viscosity modifiers that thin the slurry and (ii) stabilizers that facilitate the stability of the slurry, formed by agitating (deflocculating) the washed precipitate in water. The specific viscosity modifiers are selected to deal with the presence of significant amounts of residual chloride ions in the washed precipitate. PMH does not require grinding or hydration to make the slurry because the particle size of the PMH is similar to that of the desirable slurry, namely about 25 microns or less.

Specifically, Japanese Patent No. 54150395 describes the production of slurry by grinding dried magnesium hydroxide to a specified particle size and then mixing with water under agitation. U.S. Pat. Nos. 5,762,901 and 5,514,357 describe the stabilization of slurries in which the slurry contains chloride ions in 0.30-0.42%, by weight on an MgO basis. These describe the use of a cationic polymer and, if required, a thickening agent to stabilize the slurry, so that the slurry formed by physical deflocculation is stable, so that it can be transported and stored without substantial agglomeration of the magnesium hydroxide solids. U.S. Pat. No. 5,877,247 describes the stabilization of slurries formed from solid magnesium hydroxide using a combination of one or more polymeric dispersants and one or more water-soluble alkali metal salts. Patent EP1009717 A4 discloses the production of stabilized magnesium hydroxide slurry using wet milling of magnesium hydroxide granules to give control of the median particle size, controlled particle size range, and controlled surface area of the $Mg(OH)_2$ solids in the slurry.

The addition of viscosity-modifying agents and dispersants to slurries to control viscosity, stability and dispersability, is well-established art. Such viscosity-modifying agents or dispersants can include decomposable phosphates (FR 2399485); carboxylic acid type polymeric surfactants (JP 5-208810); polyanion and anion of strong acids such as HCl, $H_2SO_3$ or $H_2SO_4$ (DE 4302539); polymeric anion dispersant and water-soluble alkali metal salt (AU 48785/93); sulphomethylated acrylamide homopolymers or copolymers (U.S. Pat. No. 4,743,396); alkaline salts of a sulfosuccinic ester product (DE 3323730); alkali metal silicate and hydroxide and/or mineral acid salts (J 62007439); organic or inorganic dispersants (J 61270214); xanthan gum and lignin sulphonates (CA 110 (10):7837e); carboxymethylcellulose (CA 104 (6):39729k); cationic polymers (U.S. Pat. No. 4,430,248); ferrous hydroxide or aluminum hydroxide (CA 79(8):44013S) and polyacrylates (U.S. Pat. No. 4,230,610).

b) Dead-Burned Magnesia (DBM).

DBM, generally in granules of about 25 mm or less, is generally produced by the calcination of the mineral magnesite. DBM is sintered, with a very low specific surface area, often below 0.1 m²/gm. When mixed with water, the hydration of DBM to produce magnesium hydroxide is very slow, over many days and weeks. The prior art for slurries formed from DBM is focused on activating the hydration process, dealing with the propensity of insoluble magnesium hydroxide to coat the small surface area presented, and to slow down the reaction. The means of activation include wet milling to regenerate the surface, and preferably in hot water to take advantage of the fact that the hydration reaction is thermally activated, and the use of chemical additives that are associated with lifting the coating from the surface. Generally, viscosity modifiers and stabilizers are used to produce a thin, stable high-solids slurry, in the same manner required for (a).

Specifically, U.S. Pat. No. 5,487,879 A describes the process of production of a stabilized, pressure-hydrated magnesium hydroxide slurry from ground DBM. A mixture comprising ground DBM and water is pressure hydrated to provide a pressure-hydrated slurry. The pressure-hydrated slurry is then de-agglomerated. If desired, chloride ions and cationic polymer can be added to further stabilize the slurry. The pressure is preferably 2-7 bar and the temperature is preferably that of wet steam at that pressure. The process is catalyzed by the introduction of chloride ions. This patent teaches the use of magnesium chloride to catalyze the hydration of the DBM.

As an alternative to the pressure process, the wet milling of the DBM granules is described in the prior art. U.S. Pat. No. 5,906,804 A and European Patent No. 0772570 B1 describe a process for producing a stable magnesium hydroxide slurry in which wet grinding calcined magnesia granules having a particle size of about 25 mm or less, and hydrating the finely divided magnesia in a hydration zone, wherein the finely divided magnesia is mixed with water under agitation and heat so as to produce a magnesium hydroxide slurry having at least 80% hydration; and passing the slurry through a second particle reduction zone so as to produce slurry particles, wherein 90% of the slurry particles have a size less than 50 microns. A viscosity-modifying agent is added to ensure a maximum viscosity of 1000 cP. The final product is described as stable, pumpable, magnesium hydroxide slurries having a solids content of at least 40%. The viscosity-modifying agent is selected from the group consisting of either inorganic acids having a molecular weight less than 130 amu, or inorganic salts thereof having an alkali metal as a sole cation; or carboxylic acids having a molecular weight of less than 200 amu, optionally containing one or more hydroxyl groups and salts thereof, excluding salts having alkali metal as a sole cation; or polyhydric alcohols and carbohydrates containing two or more hydroxyl groups and having a molecular weight of less than 500 amu; or alkaline earth oxides, hydroxides and a combination thereof. This patent teaches recirculating the parent (unhydrated solids) through a loop until the particle is substantially consumed.

Generally, viscosity modifiers and stabilizers are used to produce a thin, stable, high-solids slurry from DBM, in the same manner required for (a).

c) Granular Caustic Calcined Magnesia (GCCM).

GCCM is also produced from the calcination of the magnesite. GCCM granules may be extracted from a kiln at an earlier stage of process than DBM. The surface area of GCCM is typically in the range of 25-60 $m^2/gm$. GCCM is also sintered, but to a lesser degree than DBM.

In the case of GCCM, the rate-limiting process for slurry formation is the wet milling of the granules. The faster hydration is associated with the use of shorter time milling processes compared to DBM. In common with slurries made from PMH and DBM, high-solids slurries require viscosity modifiers and stabilizers to produce a thin, stable, high-solids slurry.

Specifically, the production of slurries from GCCM is described in Japanese Patent No. 5-279017 and Japanese Patent No. 5-279018. GCCM is introduced into a hydration tank equipped with a stirrer or agitator and is simultaneously milled by steel balls or other form of abrading apparatus. Bron et al., *Chemical Abstracts* (CA) 68(2): 5884e (1966), refers to the hydration of magnesite-derived MgO. In this case, magnesium hydroxide was produced during boiling or short wet grinding of the MgO with water in a ball mill. European Patent No. 0599085 describes a process in which GCCM is comminuted in the wet state with a wet pulverizer and hydrated in the presence of an alkaline aqueous medium that included sodium hydroxide at an elevated temperature of not less than 70° C. The resultant pulverized material is classified into fine and coarse particles using a classifying means that is generally set to restrict the passage of particles in excess of 20 microns. Subsequently, the coarse particles are recycled to the wet pulverizer. By subjecting GCCM to concurrent wet pulverization and hydration in the presence of a heated alkaline aqueous medium, magnesia can be simultaneously comminuted and hydrated under rapid heating to produce an active magnesium hydroxide showing a low viscosity, even at a high concentration.

South Korean Patent No. 9301256 describes formation of active magnesium hydrate made from light-burned magnesite that is subjected to wet crushing with water, an alkali stabilizer inclusive of sodium hydroxide, and dispersing agent inclusive of polycarboxylate using reaction heat and crushing heat.

Generally, viscosity modifiers and stabilizers are used to produce a thin, stable, high-solids slurry from GCCM, in the same manner required for (a) and (b).

Powdered Caustic Calcined Magnesia (PCCM).

PCCM may be produced by simply grinding GCCM, or may be directly produced by the flash calcination of ground magnesite powders, or by drying slurries produced by any of the aforementioned processes and flash calcining the dried hydroxide. Most flash calciners, however, generally have the undesirable property that some particles are exposed to very high temperatures from the hot combustion gas, and calcine and sinter quickly, so that the product has variable specific surface area, and variable hydration properties. The average properties of flash calcined PCCM are otherwise similar to those of PCCM from grinding granules. Indirect heating, counterflow calciners, as described by Sceats and Horley, for example, in WO 2007/112496 (incorporated herein by reference), produce uniformly calcined PCCM with minimal sintering and a high specific surface area, which can be in the range of 100-250 $m^2/gm$ with the degree of calcination of 90-98%. Such calcined PCCM has markedly different surface chemical properties than PCCM produced by conventional methods.

The production of slurries from PCCM has been previously described. JP-2-48414 refers to a process of producing slurry from PCCM having a solids content of 5-70% wt % at above 50° C. under agitation, wherein some slurry is periodically removed and replaced by hot water and magnesia to obtain a uniform slurry density. JP 3-252311 refers to a process for preparing PCCM grinding the GCCM to a mean particle size of 5-10 microns and then subjecting the ultra-fine powder in an acidic reaction. JP-01-212214 refers to a method of manufacturing a PCCM slurry having 10-50% wt % $Mg(OH)_2$, wherein magnesia having a mean particle diameter of less than 100 microns is hydrated in the presence of alkali metal ions and/or alkaline earth metal ions and also in the presence of the hydroxide ion, nitrate ion, carbonate ion, chloride ion and/or sulphate ion. DD 272288 describes hydration of MgO resulting from $MgCl_2$ thermal decomposition carried out by (a) pre-hydrating MgO in one or more series or parallel connected hydration reactors; and (b) grinding in one or more series or parallel connected hydration reactors. JP 03-60774 refers to the production of magnesium hydroxide slurries that includes the step of slaking finely pulverized light burnt magnesia that is obtained by firing naturally produced magnesite with water with heating to 85-100° C. Sodium hydroxide is added as a hydration accelerator. It is known from JP 5-208810 and JP 3-252311, for example, that magnesia may be produced by calcination of magnesite followed by particle reduction to obtain ultra-fine particles having a mean particle size of 5-10 microns that are then hydrated to form magnesium hydroxide slurry. The hydration process can be carried out in a particle reduction zone.

It is also known to use additives to accelerate the hydration of MgO to $Mg(OH)_2$ and/or to modify the crystal shape of the magnesium hydroxide product during hydration. Such additives include citric acid or magnesium chloride (see CA 110(24):215623f), short chain carboxylic acids or corresponding salts such as magnesium acetate (JP 3-197315, JP 01-131022 and DD 280745), ammonium chloride (DD 241247); magnesium chloride, magnesium acetate, magnesium sulphate or magnesium nitrate (DD 246971); inorganic or organic acids such as HCl or acetic acid or their magnesium salts such as magnesium chloride, or magnesium acetate (CA111(18):159019n), proprionic acid (JP 63-277510), n-butyric acid (JP 63-277511), and sodium hydroxide (JP 03-60774).

JP-3-197315 refers to the production of a magnesium hydroxide slurry having 3-70 wt % and more preferably 20-50 wt % solids as an intermediate in the production of magnesium hydroxide crystals having hexagonal plate-like crystals, which are obtained as a final product of the hydration of magnesia. These crystals are utilized as a fire retardant. JP-1-131022, which is discussed in the prior art preamble of JP-3-197315, states that the purpose of addition of magnesium salts, such as magnesium acetate, or organic acids, such as acetic acid, is for controlling the rate of hydration or for controlling the growth of magnesium hydroxide crystals. The crystals that are obtained by the hydration process of this reference are regular in shape, thereby avoiding the formation of agglomerates.

Generally, viscosity modifiers and stabilizers are used to produce a thin, stable, high-solids slurry from PCCM, in the same manner required for (a), (b) and (c).

There is a need to produce low-emissions intensity slurry products to mitigate the impact of global warming. The production of PMH from brines is energy intensive and uses hydrated lime that is generally produced in lime kilns that have significant $CO_2$ emissions from both the energy consumed and from the calcination of limestone. The production of DBM and GCCM use energy-intensive kilns, that also have high $CO_2$ emissions from both the energy consumed as well as from the calcination of magnesite, as does the production of PCCM from traditional flash calciners.

In contrast, the production of PCCM using calciners, of the type described by Sceats and Horley, with indirect heating of magnesite entrained in steam produces, after steam condensation, a pure $CO_2$ stream that can be liquefied and sequestered, thereby significantly reducing the carbon footprint. Indirect heating, with counterflow, is energy efficient and, for the purpose of this specification, produces a PCCM with a very high surface area, in the range of 100-200 $m^2/gm$. In addition, this type of calciner also produces high surface area lime CaO, dolime CaO.MgO and semidolime $MgO.CaCO_3$. More generally, all carbonate minerals are a mixture of limestone, dolomite and magnesite, and the calcined material from this reactor is a powder mixture of the oxides and unreacted carbonates. These powdered caustic calcined carbonate powders are the feedstock to produce the hydroxide slurries described in this disclosure. The high surface area calcined carbonate powders are very reactive, and there is a need for a manufacturing process that can use such feedstocks for the production of slurries. In the development of this process for such high surface area materials, the process described herein can also be applied to the formation of slurries from caustic calcined carbonate powders, such as PCCM, produced using traditional flash calciners or by grinding granular caustic calcined carbonate materials, such as GCCM. The prior art described above for the production of slurries from PCCM cannot be used for the very reactive powders. There is a need for a slurry production process for powdered caustic calcined carbonates that can be applied generally to powdered caustic calcined feedstock produced by any means, and of any composition. The description below is based on PCCM because magnesia is the most difficult calcined carbonate material to slurry. The disclosure is equally applied to any powdered calcined earth carbonate, including mixtures.

Alternatively, high surface area PCCM can be obtained by drying a magnesium hydroxide slurry formed by any of the aforementioned processes, and flash calcining this material at lower temperatures, preferably below 600° C. to rapidly dehydroxylate the hydroxides to reform PCCM. The lower temperature of dehydroxylation compared to decarbonation means that the sintering of the PCCM produced by the calcination of hydroxide particles is significantly reduced, so that the surface area is further increased. The calciners described by Sceats and Horley produce a very high surface area PCCM, of about 250 $m^2/gm$, from a dried hydroxide feed, from an initial PCCM having a surface area of less than 200 $m^2/gm$. In this approach, the surface area of the PCCM is highest when the slurry has been produced by hydrating a high surface area PCCM. As described above, the surface particles in slurries produced from higher surface area PCCM are characterized by higher concentrations of reactive species such as peroxide and superoxide and, in many applications, these species are beneficial. Repeating the steps of dehydration, flash calcination and hydration allows an incremental increase in the surface area of the PCCM produced in each step, and thus the concentration of reactive species. The hydration process in each of these hydration steps requires the use of the slurry production process described in this disclosure because the rate of heat release becomes too fast for conventional slurry production processes.

Any discussion of the prior art throughout the specification should in no way be considered as an admission that such prior art is widely known or forms part of common general knowledge in the field.

BRIEF SUMMARY

Problems to be Solved

This disclosure provides a process, system, device and apparatus for production of hydroxide slurries from caustic calcined carbonate or hydroxide powders.

It is an object of this disclosure to overcome or ameliorate at least one of the disadvantages of the prior art, or to provide a useful alternative.

Means for Solving the Problem

A first aspect of this disclosure may relate to a process for producing a hydroxide slurry from caustic calcined carbonate powder, comprising the following steps: mixing caustic calcined carbonate powder with water in a reactor vessel and forming a reaction mixture; applying a shearing force to the reaction mixture using a mixing apparatus; allowing heat of hydration to raise the temperature of the reaction mixture to near the boiling point, preferably about 95° C., and allowing steam to evaporate from the reaction mixture as hydration proceeds, to remove excess heat and control reaction temperature to just below or at the boiling point.

A second aspect of this disclosure relates to a process for producing a hydroxide slurry from caustic calcined hydroxide powder, comprising the following steps: mixing caustic calcined hydroxide powder with water in a reactor vessel and forming a reaction mixture; applying a shearing force to the reaction mixture using a mixing apparatus; allowing heat of hydration to raise the temperature of the reaction mixture to near the boiling point, preferably about 95° C.; and allowing steam to evaporate from the reaction mixture as hydration proceeds, to remove excess heat and control reaction temperature to just below or at boiling point.

Preferably, the process is adapted for the production of a high-solids fraction hydroxide slurry from the reaction mixture, wherein the slurry has a relatively low resistance to shear thinning.

The process is further adapted for the production of the high-solids fraction hydroxide slurry from the reaction mixture, wherein the slurry has both a relatively low resistance to shear thinning and a relatively high concentration of reactive chemical species such as peroxide and superoxide ions.

The preferred process may additionally comprise the following steps: metering an input of a viscosity modifier to enable the mixing apparatus to maintain uniform mixing under thin slurry conditions promoted by the viscosity modifier; allowing the reaction to proceed spontaneously, during boiling, until the water has ceased to boil and the temperature dropped to a first set point; and quenching the slurry to drop the temperature to a second set point.

The preferred powder may include ground particles, wherein the ground particles are less than 100 microns in diameter. More preferably, the ground particles have a particle size distribution in the range of 0.1 up to 150 microns, and preferably with a $d_{90}$ of less than 100 microns.

The preferred powder may have a surface area preferably in excess of 100 $m^2/gm$, and more preferably in excess of 200 $m^2/gm$.

The slurry may have a final solids content, after accounting for the water loss from boiling, in the range of 40-70%. More preferably, the slurry has a final solids content, after accounting for the water loss from boiling, in the range of 55-65%.

Preferably, during the process, additional water is added, if required, to ensure that the final solids fraction meets the solids fraction specification of the slurry product.

The preferred temperature of the water during the first step is within a range of 10-25° C. The preferred mixing apparatus may comprise at least one high-shear mixer, and preferably such shear pump being external to the reactor vessel through which the slurry is circulated by the pump action, and optionally further, a paddle or other similar mixer is used to agitate the slurry in the reactor vessel.

The process may be configured to be run by a device that continuously operates all of the steps of the process in a predefined order. A viscosity modifier including, but not limited to, acetic acid or magnesium acetate, may be added to maintain the apparent viscosity in the range of 60-300 cP during the process, where the apparent viscosity is that of the slurry at a shear rate of preferably 200 cycles per second.

The first set point is after the time at which the temperature has reached a maximum, and this maximum is preferably above 90° C. Preferably, the first set point is in the range of about 85-93° C., and preferably about 93° C., with the provision that the heat losses in the reactor apparatus are sufficiently low that the length of time to reach the set point is less than 60 minutes. The preferred process may also include a step of quenching of the slurry at the end of processing in the range of about 10-60° C. and preferably about 40° C. This quenching may be conducted by transport of the slurry to a second vessel that has a temperature and heat capacity such that a desired quenching temperature is achieved.

The preferred process is adapted to yield a high-solids slurry that, after 1 month standing without agitation, exhibits syneresis of preferably less than 5% of the height of the storage vessel and preferably 3%, and a toe of preferably less than 1% of the height of the storage vessel, and that can be remixed and made to flow and pour by mild agitation.

The preferred carbonate material is calcined limestone, magnesite or dolomite.

A third aspect of this disclosure relates to a reaction apparatus for producing a hydroxide slurry from a reaction mixture of at least caustic calcined carbonate powder or caustic calcined hydroxide powder and water, wherein the reaction apparatus comprises: a reaction vessel having a first inlet adapted for receiving caustic calcined carbonate powder and a second inlet adapted for receiving water and a controller that is adapted to electronically control the process within the reaction vessel; shearing apparatus positioned within the reaction vessel for shearing the reaction mixture and wherein the rate of shearing is controlled by the controller; a viscosity sensor positioned within the reaction vessel adapted to supply viscosity information about the reaction mixture to the controller; a temperature sensor positioned within the reaction vessel adapted to supply temperature information about the reaction mixture to the controller; and a steam outlet for release of steam from the reaction vessel, such that in use, the reaction is controlled by the controller so that the heat of hydration may raise the temperature of the reaction mixture, allowing water to boil off from the reaction mixture as hydration proceeds, and removing steam via the steam outlet to remove excess heat and control reaction temperature at the boiling point.

A fourth aspect of this disclosure relates to a process and apparatus for production of hydroxide slurries from caustic calcined carbonate powders, or caustic calcined hydroxide powders, whether such powder is derived, for example, from traditional flash calciners, from the calciners described by Sceats and Horley, or by grinding of granular calcined carbonate or hydroxide powders.

In one form, the disclosure provides a process of producing hydroxide slurry from caustic calcined carbonate or hydroxide powder, including:

a) mixing caustic calcined carbonate or hydroxide powder with water in a reactor vessel;
b) shearing the reaction mixture; and
c) allowing heat of hydration to raise the temperature of the reaction mixture to a maximum near the boiling point, and allowing water to boil off from the reaction mixture as hydration proceeds to remove excess heat. The maximum and reaction temperature is bounded by the boiling point of water in the mixture.

Optional, and preferred, process steps include one or more of:

d) metering an input of a viscosity modifier to enable the mixing system to maintain uniform mixing under thin slurry conditions promoted by the viscosity modifier;
e) allowing the reaction to proceed spontaneously, during boiling, until the water has ceased to boil and the temperature dropped to a first set point; and
f) quenching the slurry to drop the temperature to a second set point.

Preferably, the reactor vessel is insulated to facilitate an accelerated increase in temperature of the reaction mixture up to the boiling point. The vessel also preferably has a steam outlet to allow escape of ready steam from the reaction vessel, such that the reaction takes place at substantially ambient pressure.

Further preferred aspects of control of the reaction include one or more of:

(i) minimizing the heat losses such that the hydration heat liberated spontaneously heats the slurry and accelerates the hydration process such that the water boils to provide the constant conditions at the boiling temperature and pressure to allow the remainder of the hydration to be controlled in a simple self-regulating manner; and (ii) mixing of the water and particles to reduce the formation of bubbles, to break up the formation of aggregates during the slurry production, and to provide mixing so that the hydration reaction at the surfaces of all particles can occur at a fast, uniform rate; and (iii) adding a viscosity modifier to maintain a thin slurry during production, with the modifier being added at a rate and to a degree necessary to allow the mixing to take place without a substantial change in the energy consumption of the mixing system.

The slurry is preferably quenched to terminate the hydration of residual magnesium oxide, and cooled to ambient conditions. The process may require no stabilizers to achieve the criteria for stable, readily thinned, high-solids magnesium slurries.

A further aspect of this disclosure provides for a reaction apparatus for producing hydroxide slurry from caustic calcined carbonate powder or caustic calcined hydroxide powder, including: a reaction vessel having an inlet for the powder and a water inlet; shearing apparatus for shearing the reaction mixture; and a steam outlet for release of steam from the reaction vessel, such that in use, the reaction is controlled by allowing heat of hydration to raise the temperature of the reaction mixture, allowing water to boil off from the reaction mixture as hydration proceeds, and removing steam via the steam outlet to remove excess heat and control the reaction temperature at boiling point.

In a fifth aspect of this disclosure, a hydroxide slurry is provided that comprises: particles of caustic calcined carbonate or hydroxide powder, and water; wherein the particles within the slurry have particle size distribution in the range of 0.1 to 100 microns; and an apparent viscosity in the range of 60-200 cP.

In a sixth aspect of the disclosure, a hydroxide slurry is provided that comprises: particles of caustic calcined carbonate or hydroxide powder having a surface area preferably in excess of 100 $m^2/gm$, or more preferably in excess of 200 $m^2/gm$, and water; wherein the particles within the slurry have particle size distribution in the range of 0.1 to 100 microns; and an apparent viscosity in the range of 60-300 cP.

Preferably, the slurry is made by the processes described in the aforementioned aspects of this disclosure.

Further forms of the disclosure will be apparent from the description and drawing, and from the abstract and claims.

In the context of this disclosure, the words "comprise," "comprising," and the like, are to be construed in their inclusive, as opposed to their exclusive, sense, that is, in the sense of "including, but not limited to."

The disclosure is to be interpreted with reference to at least one of the technical problems described or affiliated with the background art. This disclosure aims to solve or ameliorate at least one of the technical problems and this may result in one or more advantageous effects as defined by this specification and described in detail with reference to the preferred embodiments of this disclosure.

BRIEF DESCRIPTION OF THE DRAWING

Embodiments of the disclosure will be better understood and readily apparent to one of ordinary skill in the art from the following written description, by way of example only, and in conjunction with the drawing, in which:

FIG. 1 depicts a schematic drawing of a process for production of stable, thin, high-solids magnesium oxide slurry from powders of caustic calcined magnesia.

DETAILED DESCRIPTION

Preferred embodiments of the disclosure will now be described with reference to the accompanying drawing and non-limiting examples.

The production of a stable, thin, high-solids magnesium hydroxide slurry from caustic magnesia starts from the production of the PCCM. In one embodiment, the PCCM is produced by grinding granules from a conventional kiln to achieve the desired particle size distribution. In another embodiment, it is produced by flash calcining pre-ground magnesite powders in a flash calciner. These embodiments produce powders with moderate specific surface area in the range of 20-60 $m^2/gm$. In the preferred embodiment, the PCCM is prepared from flash calcining pre-ground magnesite powders in an indirectly heated, counterflow reactor to produce a high surface area material, with a specific surface area in the range of 100-200 $m^2/gm$. Alternatively, the PCCM is prepared by drying a slurry, and flash calcining the hydroxide powder in an indirectly heated, counterflow reactor to produce a very high surface area material, with a specific surface area in excess of 200 $m^2/gm$.

In the first preferred embodiment of this disclosure, the powder is mixed into a container with water in a ratio to give the ultimate solids/water ratio in the product, when account is taken of the consumption of water to form the hydroxide, and the water loss from boiling as described below. The solids and water are agitated during mixing to prevent clumping. The temperature of the water and powder may be at ambient, or either may have been preheated.

The basis for the process is that the energy released from hydration of the MgO to $Mg(OH)_2$ by liquid $H_2O$ is used to heat the products of the reaction and the excess water to 100° C., and the excess heat spontaneously boils a portion of the excess water. In the ideal case of a reactor at ambient pressure, with no heat loss and inputs at 25° C., a 60% slurry can be made in which the heat released spontaneously raises the temperature to 100° C., and the remaining heat from the subsequent reaction spontaneously boils the water. Thus, one metric ton of 60% slurry (containing 600 kg of $Mg(OH)_2$ and 400 kg of water) is produced at 100° C. by boiling off an additional 76 kg of water. This slurry is made by mixing 415 kg of MgO and 661 kg of water at 25° C. From the known thermodynamics of the reactions, the hydration of the MgO by liquid water releases 387 MJ of heat, of which 186 MJ is used to heat the materials to 100° C., and 201 MJ is used to heat and evaporate the water. In the design of the reactor, with inputs at 25° C., it follows that about 48% of the hydration reaction is complete before the boiling of the excess water occurs. Real reactors have heat losses, and minerals have impurities, so these quantities provided above are for guidance only. In the prior art, the released heat is removed using heat exchangers, or for very slow reactors, the heat is lost by convection or conduction. In this disclosure, the evaporation of the water is used to remove the heat, and the boiling point of water provides a stable operating condition for rapid processing.

The kinetics of hydration plays a very important role in the formation of slurries from DBM and PCCM. It is well established that the initial reaction rate (a) scales proportionally to the surface area of the solid particles, and (b) has an activation energy of about 60 kJ/mol. This means that the hydration reaction rate at 50° C., 75° C., and 100° C. is, respectively, 4.3, 18.1 and 57.6 times faster than that at 25° C. However, it is often observed that the rate of reaction slows down significantly before the reaction is complete, and this is attributed to the low solubility of $Mg(OH)_2$, such that $Mg(OH)_2$ crystallites coats the pore surfaces. This is particularly evident from dead-burned magnesia. The solubility of $Mg(OH)_2$ also increases with temperature, so this effect becomes less important at higher temperatures. For dead-burned materials, the very low porosity is such that it is believed that the $Mg(OH)_2$ crystals formed during the reaction are separate from the parent particle. Wet milling of DBM will remove any coating and expose new surfaces on the particles. While the grinding process of DBM is essential, the prior art also describes the use of hot water to increase the hydration rate. The milling conditions then determine the time to produce the slurry. In contrast, for very high surface area PCCM particles, the specific surface area may exceed 100 $m^2$/gm, and there is little evidence of pore-blocking effects. Without being limited to theory, migration of water to such CCM particles is probably not a rate-limiting step because of the high porosity of the particles. The most important observation is that the hydration reaction of CCM, in a well-stirred thermally insulated reactor, exhibits thermal runaway. For example, using a material with a surface area of 190 $m^2$/gm, the temperature of the well-stirred reactor initially rises spontaneously to 50° C. over 30 minutes, and this is followed by a fast process in which the temperature spontaneously rises to 100° C. within 10 minutes. The heat released by the initial hydration increases the water temperature, which increases the reaction rate so that heat released further increases the temperature. This is thermal runaway. Importantly, the boiling point of water is reached preferably within thirty minutes, and the temperature stabilizes, such that the remaining reaction can be completed, say, with an additional 120 minutes of processing at a fixed temperature through the release of steam. In this disclosure, the boiling of the water circumvents the need to control the temperature of the reactor to avert damage or hazards. Furthermore, the signature that the reaction is substantially complete is that boiling ceases and the temperature begins to fall, at a rate determined by reactor heat losses and residual hydration. It would be appreciated by a person skilled in the art that PCCM produced with a high surface area, in the range of 100-200 $m^2$/gm will be preferred as a source of PCCM, compared to PCCM with a surface area of 20-60 $m^2$/gm because the processing time will be shorter and less susceptible to heat losses that might otherwise result in the slurry not reaching the boiling point of water.

The slurries produced by a fast reaction at high temperature are characterized by particles that are bonded aggregates of small crystallites of magnesium hydroxide. These crystallites support a range of defect centers at the boundaries, which is believed to contribute to the reactivity. The higher the initial surface area of the PCCM, the higher the concentration of these defect centers.

For reasons considered below, to terminate the production, it is preferable that the reaction is rapidly quenched to below about 60° C. when the desirable degree of reaction has been reached, i.e., as determined by monitoring the drop of temperature described above. It has been demonstrated that the properties of such a quenched material does not change significantly over months. For most applications, the performance of the slurry is not impacted by a small amount of residual oxide material, so there is no absolute requirement to achieve complete hydration. When the set point is achieved, the slurry can be quenched. In a preferred embodiment, this is simply achieved by transferring the slurry batch to a steel vessel with adequate heat capacity and/or cooling, to quench the product to below about 60° C.

In summary, the evaporation of water, releasing up to about 7% of the initial water, provides a simple means whereby the slurry can continue to be hydrated to the set point for completion without the need for external control or heat transfer systems during the reaction.

In the description above, a condition for the reactor is that the slurry must be well stirred to achieve uniform kinetics.

There are several other requirements that require more detailed consideration of the mixing process. Thus the mixing:

A) rapidly mixes the water and the particles so that the hydration reaction occurs quickly;

B) rapidly mixes the water and particles so that concentration gradients do not develop, which would otherwise slow down the reaction and reduce the productivity of the plant. From a quality control perspective, the removal of concentration gradients gives a uniform product because all particles have the same temperature and see the same aqueous environment;

C) breaks down aggregates of particles that otherwise form lumps that lead to the collapse of the slurry. There is a strong tendency of particles to agglomerate at high-solids fractions, and the mixing is required to shear aggregates of particles. It is noted that aggregation leads to concentration gradients, which are to be avoided;

D) prevents the development of bubbles of steam in the mixture, which otherwise leads to foaming, which also leads to an inhomogeneous solids-liquid environment and concentration gradients; and E) comminutes the particles, so that a broader particle distribution is developed. Comminution occurs when the particles are subject to high-shear forces. It is noted that the hydration process weakens the structure of the particles as the new molecular configurations are developed. During this process, the initial particles can fragment if subject to strong shear forces.

Notwithstanding the concepts described above, experiments show that the formation of a stable slurry is facilitated by the use of a high-shear mixing apparatus that is capable of inducing each of the mechanisms described above. In more general terms, the formation of a stable slurry is rendered more difficult to achieve without the use of such a high-shear mixing apparatus. In the preferred embodiment, the shear mixing pump is external to the reactor and draws the slurry from the base of the reactor and returns the sheared slurry to the top of the reactor. A smaller pump is used to agitate the slurry in the reactor. It is observed that the reaction rate can be moderated, if required, by the settings of the high-shear mixing apparatus. It is stressed that an objective of this disclosure is to minimize the use of dispersion agents and the like, because the prior art describes instances in which these agents interfere with the applications of the slurries.

The comminution of the particles during the slurry production process has been observed during the process by sampling and measuring the change of the particle size distribution during the course of the reaction. It is believed that the stability of high-solids slurry is enhanced if the particle size distribution is broad. This broadening has been observed during the slurry formation using the high-shear mixing apparatus, and is likely to positively contribute to the stability of the slurry. Preferably, the particle size distribution of the raw feed should be a broad distribution.

In summary, the mixing of the solids is preferably accomplished using a high-shear mixing apparatus that substantially dissipates concentration gradients, agglomerates, steam bubbles and induces comminution.

All high-solids magnesium hydroxide slurries exhibit non-Newtonian viscoelastic properties, as shown by the formation of a gel, to some degree. The requirement of the gelled slurry is that it exhibits little resistance to thinning, and to that extent, it can be classified as a thin slurry. During production, the slurry must be agitated sufficiently to break down the gel structure so that the slurry can feed to the high-shear mixing apparatus described above. Post production, the slurry must exhibit a low resistance to shear thinning so that gentle agitation thins the slurry, to enable the slurry to be pumped or poured for application. The means of thinning of magnesium hydroxide slurries is well described in the prior art, and for high-solids fraction slurries, the approach of using a viscosity modifier or dispersion agent is common to all the processes previously described. That is, the use of a viscosity modifier is a factor to be considered independently of materials and method used to form the slurry. The preferable viscosity modifier is one that is low cost, and added in small amounts, typically <1%. The prior art shows that soluble salts are commonly used for this role. It is noted that the solubility of magnesium hydroxide is low, and at the pH of 10.4, the ionic strength of the water is not very high. A preferred approach to increase the ionic strength is to use an acid, such as acetic acid, which reacts essentially completely with the magnesium hydroxide to form magnesium acetate ions, which act as the viscosity modifier. The pH of such a slurry is lowered to about 9.5 as a result of the ionic strength, and this pH increases back to 10.4 when the slurry is diluted.

The stability of the slurry is, as described in the prior art, an important characteristic. Measurements during the production of the slurry show that the stability of the slurry increases during the hydration process. That is, samples of slurry extracted from the reactor during the early stages of hydration immediately collapse, while samples taken at later stages take progressively longer to settle and, toward the end of the reaction, the slurry does not settle on the timescale of months. These characteristics do not apparently change during cooling of the sample. The evolution of the slurry stability is a complex process that is linked to the degree of hydration, the mixing process, especially shear, and the use of viscosity modifiers. Importantly, there is no adverse effect of boiling water on the slurry characteristics provided that the water content is managed to account for the loss.

The embodiment of the process shown in FIG. 1 shows a batch reactor for the production of a magnesium hydroxide slurry from PCCM. The batch process starts with filling the reactor vessel 100 with preferably cold water 101, and then the PCCM 102 is metered into the water, preferably over a 10-15-minute timescale. The reactor is preferably insulated. The slurry 103 is stirred by a paddle 104 and a portion of the material is sheared by a shear pump 105 after routing through valve 106 at the base of the reactor. The sheared slurry is returned to the reactor near the top of the slurry surface at 107. As the reaction proceeds, the temperature of the slurry in the reactor rises due to the exothermic hydration process. As the slurry begins to gel, a viscosity modifier 108, such as acetic acid, is metered into the reactor to the apparent viscosity, so that the amount of modifier is just sufficient to maintain the apparent viscosity at a sufficiently low level that the paddle stirrer 104 and the shear pump 105 can operate within their specifications. In addition, as the reaction proceeds, the water approaches the boiling point, slightly below 100° C., and steam 109 is ejected from the reactor through the stack 110. The mass loss of steam is preferably measured. The viscosity, at one or more shear rates is measured, along with the temperature and the mass flow of slurry through the shear mixer. When the reaction is nearly complete, the boiling ceases and the temperature in the reactor begins to fall. Samples of the slurry may be taken and important properties, such as the stability, zeta potential and the viscosity, are measured to determine that the reaction has progressed to the point that a thin, stable slurry has been obtained. The shear pump 105 is turned off, and the slurry 111 is drained from the reactor at the base through valve 106. The slurry is preferably quenched during transport to a vessel (not shown), in which the transport pipes and/or the vessel has either the required heat capacity, or is cooled, so that the slurry rapidly cools to below 60° C. When quenched in this manner, the thin, stable high-solids slurry is formed with the desirable attributes. The slurry can be left to cool to ambient temperatures.

Process control is thereby simplified and costs reduced by using boiling point as a boundary to control the process temperature and, optionally, by using a simple quenching mechanism to stop the reaction.

The simplicity of the process allows the establishment of transportable slurry plants that can be conveniently located relative to the site of production of the magnesium oxide powder and the sites of consumption to reduce the costs of transporting slurries over long distances. For example, the disclosure may be embodied in a compact apparatus that can be stationed in processing plants that are distant from the source of production of the magnesite powder.

The slurries can be produced from a wide variety of caustic calcined carbonate and hydroxide materials and mixtures thereof. Such slurries can have substantially different chemical properties that depend on the surface area of the powder.

Preferably, the slurry forming part of the first preferred embodiment of this disclosure may include a slurry of a predetermined viscosity. Specifically, the viscosity of the slurry may be sufficient to allow for the slurry to be sprayed onto the walls of a sewage pipe so as to coat the interior of the pipe. Preferably, the viscosity of the slurry is sufficiently high enough to allow the slurry to adhere to the walls of the pipe without falling off, while maintaining a viscosity low enough to allow the slurry to be pumped and applied to the walls by a pumping apparatus or spraying machine.

In this specification, the word "comprising" is to be understood in its "open" sense, that is, in the sense of "including," and thus, not limited to, its "closed" sense, that is the sense of "consisting only of." A corresponding meaning is to be attributed to the corresponding words "comprise," "comprised," and "comprises" where they appear.

It will be understood that the disclosure defined herein extends to all alternative combinations of two or more of the individual features mentioned or evident from the text. All of these different combinations constitute various alternative aspects of the disclosure.

While particular embodiments of this disclosure have been described, it will be evident to those skilled in the art that this disclosure may be embodied in other specific forms without departing from the essential characteristics thereof. The present embodiments and examples are, therefore, to be considered in all respects as illustrative and not restrictive, the scope of the invention being indicated by the appended claims rather than the foregoing description, and all changes that come within the meaning and range of equivalency of the claims are, therefore, intended to be embraced therein. It will further be understood that any reference herein to known prior art does not, unless the contrary indication appears, constitute an admission that such prior art is commonly known by those skilled in the art to which the disclosure relates.

Although the disclosure has been described with reference to specific examples, it will be appreciated by those skilled in the art that the disclosure may be embodied in many other forms in keeping with the broad principles and the spirit of the disclosure described herein.

This disclosure and the described preferred embodiments specifically include at least one feature that is applicable to industry.

What is claimed is:

1. A process for producing a hydroxide slurry from caustic calcined hydroxide powder, comprising the following steps:
    a) mixing the powder with water in a reactor vessel and forming a reaction mixture;
    b) adding a viscosity modifier to the reaction mixture;
    c) applying a shearing force to the reaction mixture using a mixing apparatus;
    d) allowing heat of hydration to raise a temperature of the reaction mixture to a temperature in a range of 85–95° C.; and
    e) allowing steam to evaporate from the reaction mixture as hydration proceeds, to remove excess heat and control a maximum reaction temperature to be in the range of 85–95° C., wherein the hydroxide slurry including the viscosity modifier formed by steps (a)-(e) has a pH of about 9.5.

2. The process for producing the hydroxide slurry of claim 1, wherein the process produces a high-solids fraction hydroxide slurry from the reaction mixture, wherein a weight of solids in the high-solids fraction hydroxide slurry is in a range of 40-70% and wherein the high-solids fraction hydroxide slurry has a relatively lower resistance to shear thinning with respect to a hydroxide slurry having a weight of solids less than 40%.

3. The process for producing the hydroxide slurry of claim 2, wherein the process additionally comprises the following steps:
    f) metering an input of the viscosity modifier to enable the mixing apparatus to maintain uniform mixing under thin slurry conditions promoted by the viscosity modifier;
    g) allowing the reaction to proceed spontaneously, using evaporation to balance heat release, until a temperature of the water has reached a maximum temperature and the temperature of the reaction mixture has dropped to a first set point; and
    h) quenching the high-solids fraction hydroxide slurry to drop the temperature of the reaction mixture to a second set point.

4. The process for producing the hydroxide slurry of claim 3, wherein the maximum temperature of the water is near the boiling point of the reaction mixture.

5. The process for producing the hydroxide slurry of claim 4, wherein the first set point is in the range of 85–95° C.

6. The process for producing the hydroxide slurry of claim 3, wherein the powder includes ground particles having a particle size distribution of less than 100 microns.

7. The process for producing the hydroxide slurry of claim 3, wherein the powder includes ground particles having a particle size distribution in the range of 0.1 to 150 microns.

8. The process for producing the hydroxide slurry of claim 3, wherein the slurry has a final solids content, after accounting for a water loss from boiling, in a range of 40-70% by weight of solids.

9. The process for producing the hydroxide slurry of claim 8, wherein the slurry has a final solids content, after accounting for the water loss from evaporation, in a range of 55-60% by weight of solids.

10. The process for producing the hydroxide slurry of claim 3, further comprising adding water during at least one of steps (a)-(h) to ensure that a final solids fraction is in a range of 40-70% by weight of solids.

11. The process for producing the hydroxide slurry of claim 2, wherein the process produces the high-solids fraction hydroxide slurry from the reaction mixture, wherein the high-solids fraction hydroxide slurry has a relatively higher concentration of chemically reactive species with respect to the hydroxide slurry having the weight of solids less than 40%.

12. The process for producing the hydroxide slurry of claim 11, wherein the powder has a surface area between 100-200 $m^2/gm$ or greater than 200 $m^2/gm$.

13. The process for producing the hydroxide slurry of claim 2, wherein a temperature of the water during step (a) is within a range of 10–25° C.

14. The process for producing the hydroxide slurry of claim 2, wherein the mixing apparatus comprises at least one high-shear mixer.

15. The process for producing the hydroxide slurry of claim 3, further comprising continuously repeating steps (a)(h) in a predefined order.

16. The process for producing the hydroxide slurry of claim 1, wherein adding the viscosity modifier to the reaction mixture comprises adding the viscosity modifier to the reaction mixture to maintain an apparent viscosity in the range of 60-300 cP during the process, where the apparent viscosity is that of the hydroxide slurry at a shear rate of 200 rpm.

17. The process for producing the hydroxide slurry of claim 3, wherein the first set point is in the range of about 85-95° C., and wherein heat losses in the reactor vessel are sufficiently low that the length of time to reach the first set point is less than 60 minutes.

18. The process for producing the hydroxide slurry of claim 3, wherein quenching the high-solids fraction hydroxide slurry comprises transporting the high-solids fraction hydroxide slurry to a second vessel that has a temperature and heat capacity such that achieved temperature of the high-solids fraction hydroxide slurry drops to the second set point.

19. The process for producing the hydroxide slurry of claim 18, wherein the second set point is in the range of 10–60° C.

20. The process for producing the hydroxide slurry of claim 18, wherein the second set point is 40° C.

21. The process for producing the hydroxide slurry of claim 1, wherein the process yields a high-solids fraction hydroxide slurry that, after 1 month standing without agitation, exhibits syneresis of less than 5% of a height of a storage vessel, and a toe of less than 1% of the height of the storage vessel, and that can be remixed and made to flow and pour by mild agitation.

22. The process for producing the hydroxide slurry of claim 1, wherein the powder is selected from the group consisting of calcined limestone, calcined magnesite, and calcined dolomite.

23. The process for producing the hydroxide slurry of claim 1, wherein:

mixing the powder with water in a reactor vessel comprises providing the caustic calcined hydroxide powder through a first inlet of the reactor vessel and providing the water through a second inlet of the reactor vessel, the reactor vessel comprising a controller that is adapted to electronically control the process within the reactor vessel, a viscosity sensor positioned therein and adapted to supply viscosity information about the reaction mixture to the controller, and a temperature sensor positioned therein and adapted to supply temperature information about the reaction mixture to the controller;

applying a shearing force to the reaction mixture comprises applying a shearing force to the reaction mixture with a shearing apparatus positioned external to the reactor vessel, wherein the rate of shearing is controlled by the controller; and allowing steam to evaporate from the reaction mixture comprises evaporating steam through a steam outlet of the reactor vessel, such that, in use, the reaction is controlled by the controller so that the heat of hydration may raise the temperature of the reaction mixture, allowing water to boil off from the reaction mixture as hydration proceeds, and removing steam via the steam outlet to remove excess heat and control reaction temperature at boiling point.

24. The process for producing the hydroxide slurry of claim 1, wherein mixing the powder with water in a reactor vessel comprises mixing particles of the caustic calcined hydroxide powder with the water, wherein the particles have particle size distribution in the range of 0.1 to 150 microns; and wherein the reaction mixture has an apparent viscosity in the range of 60-300 cP.

* * * * *

UNITED STATES PATENT AND TRADEMARK OFFICE
CERTIFICATE OF CORRECTION

PATENT NO. : 10,800,683 B2  
APPLICATION NO. : 16/282094  
DATED : October 13, 2020  
INVENTOR(S) : Sceats et al.

Page 1 of 1

It is certified that error appears in the above-identified patent and that said Letters Patent is hereby corrected as shown below:

In the Specification  
        Column 3,    Line 3,    change "gravity setting," to --gravity setting;--

In the Claims  
    Claim 15,    Column 18,    Line 32,    change "(a)(h) in a" to --(a)-(h) in a--

Signed and Sealed this  
Eighth Day of December, 2020

Andrei Iancu  
*Director of the United States Patent and Trademark Office*